Feb. 20, 1940.  R. G. ANDERSON  2,190,761
RAILWAY TRUCK
Filed Dec. 15, 1937

Inventor:
Robert G. Anderson,
by Harry E. Dunham
His Attorney.

Patented Feb. 20, 1940

2,190,761

UNITED STATES PATENT OFFICE 2,190,761

RAILWAY TRUCK

Robert G. Anderson, Erie, Pa., assignor to General Electric Company, a corporation of New York Application December 15, 1937, Serial No. 179,907

4 Claims. (Cl. 105—182)

My invention relates to trucks for railway vehicles.

An object of my invention is to provide an improved railway truck providing a flexible resilient support for the balanced vertical loads and providing a resilient mechanism for equalizing the load or other forces transversely of the sides of the truck for restraining transverse tilting thereof.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
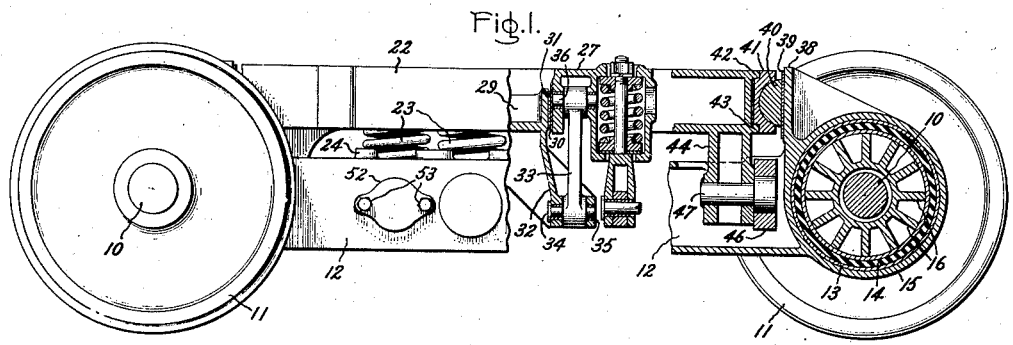
Figure 2:
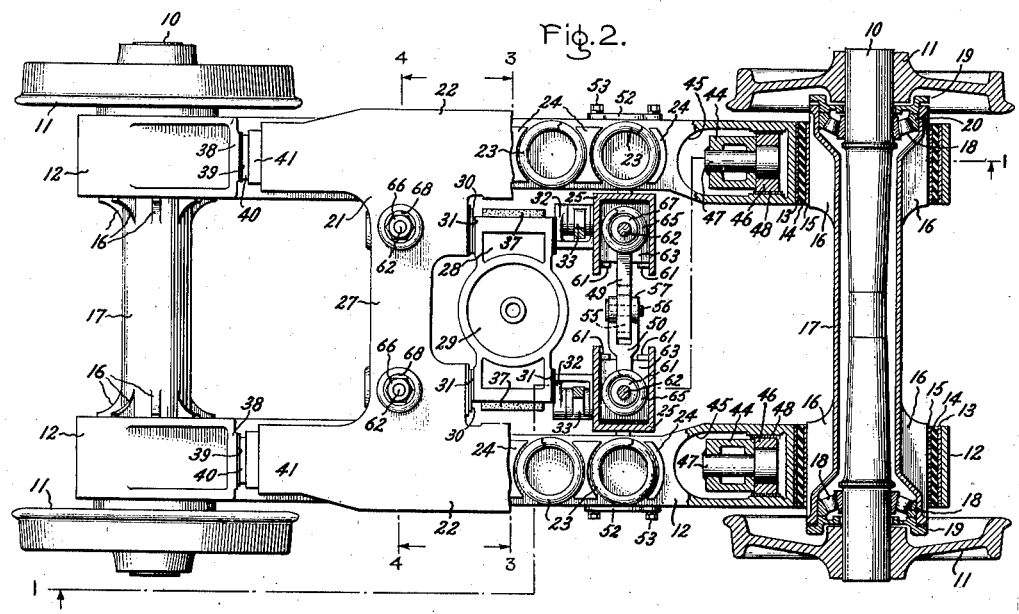
Figures 3, 4:
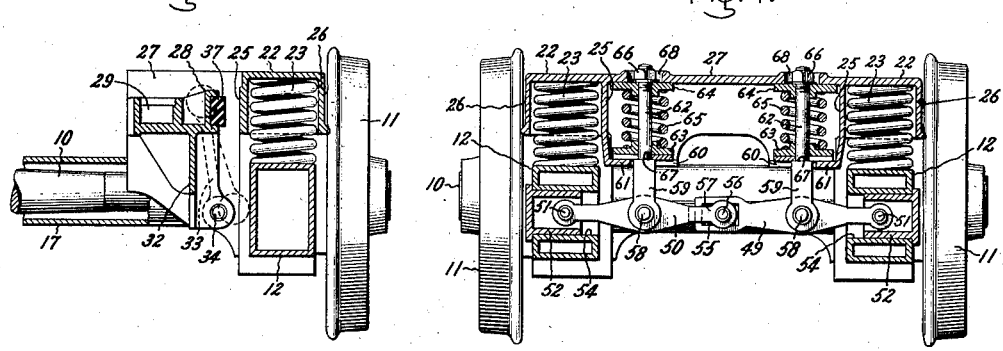

In the drawing, Fig. 1 is a side elevation of a truck embodying my invention and is a partial sectional view taken along line 1—1 of Fig. 2; Fig. 2 is a plan view of the truck shown in Fig. 1 shown partly in section to more clearly illustrate the relative arrangement of the supporting elements; Fig. 3 is a partial sectional view taken along line 3—3 of Fig. 2; and Fig. 4 is a sectional view taken along line 4—4 of Fig. 2.

Referring to the drawing, in Fig. 1 I have shown a truck for a railway vehicle having a pair of axles 10, each supported by a pair of wheels 11 and arranged to support longitudinally extending equalizers 12. Each end of the equalizers 12 is made cylindrical, and a cylindrical shell 13 is secured therein and supported on a resilient rubber ring 14 arranged between the shell 13 and another cylindrical shell or rim 15 supported by web spokes 16 on each end of a cylindrical housing 17 extending about the axle 10 and supported thereon at each end by roller bearings 18. A closure plate 19 extends in closely spaced relation about the axle 10 adjacent the inner side of the wheel 11 and is secured to the outer race 20 of the roller bearings 18 in order to provide an end closure for the housing 17 to exclude foreign substances therefrom and to protect the roller bearings 18.

A truck frame 21 provided with side frames 22 is resiliently supported by a plurality of coil springs 23 engaging spring seats 24 on the top of the equalizers 12. The coil springs 23 also are retained in position by the overhanging flanges 25 and 26 formed on each side of each of the side frames 22. In this manner, the vertical loads and shocks are transmitted between the truck frame 21 and the equalizers 12 through the resilient coil springs 23 arranged on each side of the truck. A pair of transoms 27 extends between and joins the two side frames 22. The transoms 27 are longitudinally spaced apart, and a swing bolster 28 having a center bearing plate 29 is arranged intermediate the inner sides of these transoms. Longitudinal forces are transmitted between the bolster 28 and the transoms 27 through vertically extending bearing plates 30 and 31 arranged adjacent each end of the transoms 27 and the bolster 28, respectively. The swing bolster 28 is transversely movable and is swingably supported on the transoms 27 of the truck frame by a pivoted link mechanism, which is arranged to transmit a centering force to the swing bolster 28 when it is laterally displaced from its central position. This link mechanism includes four vertically extending brackets 32 formed on the under side of the swing bolster 28 and supporting swinging links 33 pivotally secured by pins 34 extending through bearings 35 to the lower end of the brackets 32. The upper ends of the supporting links 33 are pivotally secured by pivot pins 36 to the ends of the transoms 27. Two of these links are arranged at each end of the swing bolster 28. As shown in Fig. 3, the upper ends of the links 33 are supported on the transoms 27 nearer the center of the truck than the lower ends of the links 33, which are secured to the brackets 32 of the bolster. With such an arrangement, if the swing bolster moves transversely of the truck the lower ends of the supporting links 33 on the side of the bolster adjacent the truck side away from which the bolster moves may move a relatively large distance transversely inwardly of the truck without appreciable vertical movement of the lower end of the link, and consequently of the bolster, as the lower end of the link 33 on this side of the bolster travels along the lower portion of an arc about the upper pivot pin 36. The lower ends of the supporting links 33 on the side of the bolster adjacent the side of the truck toward which the bolster moves move an appreciable distance vertically, as the lower pivot pin 34 in its normal position is arranged at about the outer limit of the lower arc of the circle about the upper pivot pin 36, and any further transverse movement of the bracket 32 moves the lower pivot pins 34 both transversely outwardly and upwardly. This tendency for the lower end of the supporting link 33 to move in an upward direction as well as outwardly when the swing bolster 28 moves transversely of the truck, transmits this upward movement to the center bearing plate 29 and is resisted by the load on the center bearing plate, and thereby tends to prevent this relative vertical movement of the lower end of the supporting link 35 and thereby restrains the lateral movement of the swing bolster 28. In order to dampen shocks and vibrations transmitted transversely between the inner sides 25 of the side frames 22 and the ends of the swing bolster 28, a side bearing 37 made of a resilient rubbery material, such as resilient rubber, is mounted on each end of the swing bolster 28 and arranged to engage the inner surface of the downwardly extending flanges 25.

In order to transmit longitudinal forces between the ends of the truck frame 21 and the equalizers 12, an upwardly extending flange 38 is formed on each end of the equalizers 12 and is provided with an upwardly and transversely extending bearing surface 39, which is arranged to engage a complementary flat bearing surface on the flat side of a semi-cylindrical bearing 40. The curved side of the semi-cylindrical bearing 40 engages a complementary curved semi-cylindrical bearing surface formed in a bearing 41 supported between flanges 42 and 43 formed on the ends of the side frames 22 of the truck frame. In this manner, the longitudinal forces are transmitted from the truck frame through the side frames 22 to the semi-cylindrical bearing 40 and through brackets 38 to the ends of the equalizers 12 without restraint against relative vertical displacements.

Lateral forces are transmitted between the truck frame 21 and the equalizers 12 by providing a downwardly extending arm 44 arranged at each end of the side frames 22, and the arm 44 is formed integral therewith and extends through an opening 45 formed adjacent the end of the equalizer 12. A roller bearing 46 is pivotally secured by a pivot pin 47 to the lower end of the arm 44 and is arranged to engage upwardly and longitudinally extending bearing surfaces 48 formed on the sides of the opening 45 on the side of the equalizer 12. In this manner, transverse forces are transmitted from the truck frame 21 to the side frames 22 and through the arms 44 and the roller bearing 46 to the equalizer 12.

Thus, all longitudinal forces are transmitted between the truck frame and the equalizers through the semi-cylindrical bearing 40, the transverse loads are transmitted from the truck frame to the equalizers through the roller bearings 46, and the balanced vertical loads are resiliently transmitted from the truck frame to the equalizers through the coil springs 23 arranged on each side of the truck.

In order to provide flexibly for transverse tilting and shocks with restraint against excessive transverse tilting, I provide a restraining force transmitting interconnected link mechanism extending between the sides of the truck frame and arranged to equalize the load or other forces on both sides of the truck. An interconnected link mechanism is arranged on each side of the bolster 28 and is arranged to cooperate with the transoms 27 of the truck frame and is pivotally secured to the equalizer 12. Each of these link mechanisms includes two complementary sections provided with transversely extending equalizer links 49 and 50 pivotally secured at the outer ends thereof by pivot pins 51 to supporting plates 52 secured by bolts 53 in openings 54 formed in the equalizers 12. The inner end of the link 49 is formed with an opening 55 through which a pin 56 extends. A bearing block is arranged on the pin 56 and slidably engages the sides of the opening 55, and the pin 56 extends through a bifurcated inner end 57 of the link 50, thereby providing a lost-motion connection between the inner ends of the links 49 and 50. The links 49 and 50 are pivotally secured by pivot pins 58 to the lower ends of links 59 which extend upwardly through openings 60 formed in flanges 61 arranged on the bottom of the inner flanges 25 of the side frames 22 of the truck frame. The upper ends 62 of the links 59 are formed of reduced section and extend through plates 63 and 64, which are formed as spring seats, which are movable substantially vertically and are biased apart by a coil spring 65 held under compression between these spring seats 63 and 64 by nuts 66 which threadedly engage the upper end of the links 59 and by shoulders 67 formed on the links 59 at the lower ends of the portions 62 of reduced diameter. The upper end of the links 59 and the nuts 66 extend through openings 68 formed through the tops of the transoms 27, and the spring seats 64 engage the under sides of the transoms 27 below the openings 68.

With such an arrangement, any balanced vertical forces transmitted to this interconnecting link mechanism from the truck frame 21 through the bolsters 27 or from the equalizers 12 through the plates 52 and the pivotal connections 51 are not transmitted between the truck frame and the equalizers through the link mechanism. Such forces will tend to cause the two sections of the link mechanism to move in the same direction, thereby tending to cause the links 49 and 50 both to pivot upwardly or downwardly, according to the direction of the force, about the pivot pins 51 or 58, and the lost-motion connection at the inner ends of the links 49 and 50 will permit these inner ends to slide with respect to each other without transmitting any restraining force between the links 49 and 50. However, if the loading on the two sides of the truck is not equal, the unbalanced vertical forces acting on the truck frame 21 will tend to produce a transverse tilting of the frame. This tilting of the frame will cause the ends on one side of the truck of the transoms 27 to be lower than the other ends of the transoms and these lower ends will transmit a vertical force through the portions of the transoms about the openings 68 to the spring seats 64 and to the coil springs 65 which will tend to compress these springs between the upper spring seats 64 and the lower spring seats 63 on the lower side of the truck, as these lower spring seats 63 are held by the shoulders 67 as the flanges 61 move downwardly away from the under side of the spring seats 63. Thus, the coil springs 65 on the side of the truck which is tilted in a downward direction are compressed and transmit part of the unbalanced vertical force acting on this side of the truck through the springs 23 on this side of the truck and part thereof through the springs 65 and the spring seats 63 to the shoulders 67 of the links 59, and through the pivotal connections 58 of the links 59 to the transversely extending links 49 or 50. Since the outer ends of the transversely extending links 49 and 50 are pivotally secured at 51 to the equalizers 12, the transversely extending links will tend to pivot in a downward direction about the pivot pins 51 and the inner ends of the links on the lower side of the tilted truck will tend to move downwardly. This tendency for the inner ends of the transverse links to move downwardly transmits the unbalanced vertical force through the lost-motion connections at these inner ends to the other transversely extending links, which are pivotally secured at 51 to the equalizer 12 on the other side of the truck, and tends to move the inner ends of the links on the other side of the truck in a downward direction. This tends to produce a downward pivoting of the other transverse links on the other side of the truck, which also tends to move downwardly the pivotal connections 58 to the upwardly extending links 59, and transmits the unbalanced force through the upwardly extending links 59 to the nuts 66 at the upper end of the links 59, and thereby tends to move the upper spring seats 64 on this other side of the truck downwardly towards the lower spring seats 63. These lower spring seats are restrained and prevented from moving downwardly by engagement with the flanges 61 at the lower end of the inner side 25 of the side frame 22 on this other side of the truck. This tends to compress the springs 65 between the spring seats 64 and 63, and thereby transmits the unbalanced vertical force through the springs 65 and the spring seats 63 to the side frame 22 on the other side of the truck from the side which tends to move in a downward direction due to the transverse tilting of the truck. In this manner the interconnected link mechanism resiliently transmits the unbalanced vertical force in both directions and tends to equalize the loading transversely of the truck and restrains transverse tilting thereof.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A truck having a frame provided with longitudinally extending members at each side thereof, a plurality of axles extending transversely of said frame between two sides thereof, other members extending longitudinally of said truck frame between said axles on each side thereof, means for resiliently supporting the balanced vertical load of said truck frame on said axles, an interconnected link mechanism including a pair of links pivotally secured intermediate the ends thereof to said truck frame one adjacent to each side of said truck frame and having resilient elements arranged to transmit resiliently vertical forces in both directions with respect thereto for equalizing the forces on each of said two sides of said truck, the inner ends of said links being pivotally secured together by a lost-motion connection, and means for pivotally connecting the other end of each of said links to said other longitudinally extending members.

2. A truck having wheels and axles, equalizers extending between and supported by adjacent axles, a truck frame, means for resiliently supporting said truck frame at each side on said equalizers, a swing bolster supported on said truck frame, and an interconnected link mechanism including a pair of links pivotally secured intermediate the ends thereof for resilient relative vertical movement to said truck frame and extending between the sides of said truck frame for equalizing the forces on said resilient frame supporting means, the outer ends of each of said pivoted links being pivotally secured to said equalizers and the inner ends thereof being pivotally secured together by a lost-motion connection.

3. A truck having a frame including a bolster extending transversely between the sides of said frame, means for swingably supporting said bolster on said frame, an equalizer extending longitudinally on each side of said frame, a link mechanism for equalizing vertical forces transversely of said frame including two sections arranged one on each side of said frame, each of said sections comprising a pair of oppositely disposed substantially vertically movable spring seats, a spring arranged to urge apart said pair of spring seats, stops arranged on said frame to limit the movement of said spring seats, means extending between said spring seats arranged to engage the outer side of said spring seats and to transmit forces through said spring seats to compress said spring, a link pivotally connected intermediate the ends thereof to said force transmitting means extending between said spring seats, means pivotally connecting the outer end of said lever to one of said equalizers on the corresponding side of said frame, and means including a lost-motion connection for pivotally connecting together the inner ends of said links of each of said sections.

4. A truck having wheels and axles, a cylindrical housing arranged about and supported on each of said axles, a cylindrical rim arranged about each end of each of said housings, web spokes arranged to support said rims of said housings, equalizers extending longitudinally of said truck at each side thereof and having cylindrical openings in the ends of said equalizers arranged about said rims, means including a resilient rubber ring arranged between said rims and said cylindrical openings in said equalizers for resiliently supporting said equalizers on said axles, a truck frame having side frames, means including a link mechanism having a pair of links pivotally connected together at the inner ends thereof and connected at each outer end thereof to the adjacent equalizer of said truck and having resilient elements arranged to transmit resiliently vertical forces in both directions from said links with respect to said truck frame for restraining tilting of said truck frame and for equalizing forces on each side of said truck, means for resiliently supporting said truck frame on said equalizers, said equalizers being provided with a vertically extending opening adjacent each end thereof, complementary vertically extending bearings arranged on the inside of each of said vertical openings in said equalizers, an arm projecting downwardly from adjacent each end of said side frames into said vertically extending opening in said equalizers, means including a bearing secured to said arms and arranged in engagement with said vertically extending bearings for transmitting lateral forces between said side frames and said equalizers, upwardly extending flanges arranged adjacent each end of said equalizers, and means including pivotal bearings arranged between said flanges and each end of each of said side frames for transmitting longitudinal forces between said equalizers and said side frames.

ROBERT G. ANDERSON.